March 14, 1967 P. E. J. M. MALDAGUE 3,309,282
METHODS FOR THE OPERATION OF NUCLEAR POWER GENERATING STATIONS
Original Filed March 3, 1959
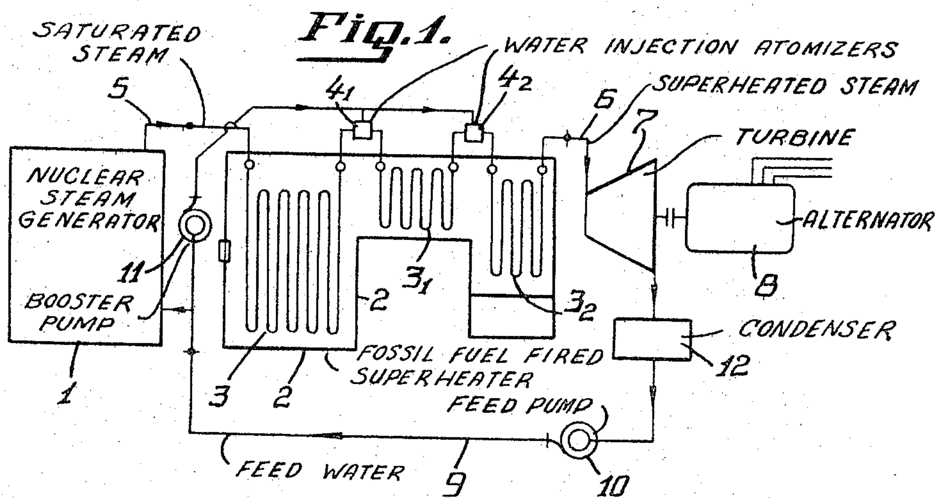
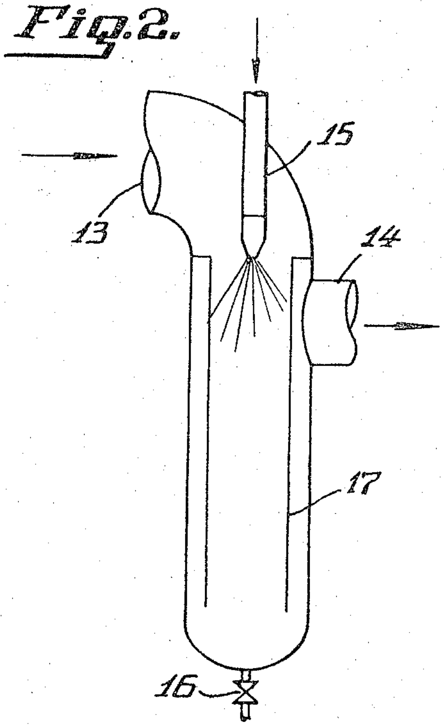
INVENTOR:
PIERRE EDMOND JULES MARIE MALDAGUE
By
E. M. Squire
his ATTORNEY

United States Patent Office 3,309,282

Patented Mar. 14, 1967

3,309,282

METHODS FOR THE OPERATION OF NUCLEAR POWER GENERATING STATIONS

Pierre Edmond Jules Marie Maldague, 232 Ave. Winston Churchill, Brussels, Belgium Continuation of application Ser. No. 796,824, Mar. 3, 1959. This application Nov. 2, 1964, Ser. No. 420,465
Claims priority, application Luxembourg, Aug. 4, 1958, 36,316
2 Claims. (Cl. 176—65)

This application is a continuation of my copending application Ser. No. 796,824 filed Mar. 3, 1959, now abandoned.

The present invention relates to nuclear power plants and more particularly to methods for their operation.

Hereinafter, the expression "nuclear power station" will be used to designate any complete plant adapted to produce mechanical or electrical power and including a nuclear reactor as the main steam generator; said expression covers both stationary plants and mobile plants such as those conveyed over ground, on the sea or on airborne vehicles.

It is a well-known fact that the technology of nuclear power reactors is progressing rapidly. This leads to a gradual increase in the thermal power that can be extracted from a given reactor. This increase is due chiefly to continuing developments in nuclear core technology. In most types of power generating reactors, it is neither difficult, nor expensive, to provide at the initial design stage for a reasonable increase in the thermal power which may be produced by the successive cores to be used within the useful life of the reactor. For instance, a nuclear steam generator of the pressurized water type can presently be designed and constructed for an evaporation capacity P higher than the evaporation capacity $P_0$, which is presently acceptable with the first core, this design leading to a cost price C which is in a predetermined relationship with reference to the cost-price $C_0$ corresponding to the capacity $P_0$, which relationship is expressed by:

$$\text{Log}\,\frac{C}{C_0}=0.07\,\log\frac{P}{P_0}$$

said relationship being valid for values of $P/P_0$ ranging up at least 1.3.

Said increase in the capital cost of the nuclear steam generator is consequently very small in comparison with the increase in capacity. Unfortunately, the same is not the case for independent super-heaters fired with fossil fuel and for auxiliary equipment, to transform the potential energy of steam into useful electrical or mechanical energy, for which superheaters, turboalternators and auxiliaries, the capital cost varies with power and can be estimated according to the equation:

$$\text{Log}\,\frac{C}{C_0}=k\cdot\log\frac{P}{P_0}$$

wherein $k$ has a value of about 0.6.

When a nuclear power station is to be built, there arises the problem of optimizing the nominal capacity of the power station.

A first known solution for said problem is to match exactly the capacity of the station with the heat output expected from the first core of the nuclear steam generator.

But in this case one could not take full advantage of the improvements in successive cores, since the nuclear power station will not be able to produce the additional power obtainable through these improvements.

In such a case, the future modification of the power station with a view to obtaining the higher power would require very expensive additions per unit of additional power since the subsequent additions would be constituted by additional equipment and installations of much smaller capacity to make use of the potential extra power.

Furthermore, determining the additional power to be installed in such a case at a given moment would raise again the problem associated with further improvements in core power output.

Another possibility is to build the station initially with a power output higher than that obtainable with the first core. Of course in this case, improvements in the successive cores would be fully utilized without any addition, the limitation being the nominal power output of the station.

This solution has however two serious drawbacks: on the one hand, the initial capital for the power station would be substantially increased without any compatible power output using the first core. This leads to an unwarranted increase in the cost price of the useful kwh. produced by the power station, not only with the first core, but also with subsequent improved cores as long as the latter do not permit the operation of the power station at its full nominal power; on the other hand, there is a risk that the progress in core technology might be much slower than anticipated.

It appears from these considerations that the investment cost per kwh. for a given nuclear power station cannot be optimized throughout the entire life of the nuclear power station, account being taken of the possible improvements in cores: either this cost is at a minimum with the first core, and cannot be improved later, or it is higher with the first core, in which case there is a possible cost risk from initial overinvestment.

The purpose of this invention is to avoid the above mentioned drawbacks.

This proposition is based on the incorporation, in the steam circuit, of a fossil fuel fired superheater with special features, the role of which is to permit an appreciable additional evaporation capacity as long as the NSG cores do not permit the full steam capacity for which the turbine is designed (NSG=nuclear steam generator).

Assuming:

$P_0$: maximum steam flow of the nuclear steam generator corresponding to the thermal output of the first core.

$P_1$: ultimate steam flow that could reasonably be expected from the NSG with fully developed cores.

According to my invention, the proposed superheater is designed at the start, according to conventional methods, as a normal superheater of any known type, for a normal steam flow $P_1$, defined hereinabove; however all apparatus included in the air, gas and fuel circuits is designed on the basis of a given overload capacity, of the order of 1.20 $P_1$ for instance.

This takes into account the well-known technical principle according to which it is possible to operate such an overloaded superheater for periods of the same order of magnitude as the time required to develop improved cores.

The superheater so designed is modified according to the invention by incorporation of the following special features: each tubular section through which the steam passes successively except the first section, is provided at the inlet with a desuperheater of any known type operating by the injection of atomized water, said injection being automatically regulated in any convenient manner so that the final steam temperature at the outlet of the superheater is maintained at the desired value. The design of the superheater and of the water injection regulation must be arranged in such a manner as to prevent hot points in the tubular sections, not only at full load and full steam flow from the NSG, but under all operating conditions that can be expected.

In practice, in each desuperheater, one or more atomizers may be provided and the pressure of the injected water is substantially higher than the steam pressure.

The maximum total flow of injected water is such that the 1.20 $P_1$ thermal capacity of the superheater corresponds exactly to the sum of the capacity required for superheating the $P_0$ steam flow from the nuclear steam generator and of the capacity required for the evaporation and superheating of the injected water.

The tubular sections are designed so as to be capable of operation without any damage under the different conditions of thermal load which are likely to be encountered in practice for all the ratios of steam flow between the outlet and the inlet which ratios may be lower than, or equal to the maximum flow ratio for which the equipment is designed.

For instance the total maximum flow of injected water may be 15% by weight of the steam flow produced by the nuclear steam generator with the first core.

The invention makes it possible to design and operate the nuclear power station, from the outset, with a superheated steam flow higher than the steam flow generated by the NSG with the first core. Furthermore, the increasing power output of the next cores can be utilized without adding any equipment to the power station. The effective capacity of the station does not depend on the rapidity of the availability of improved cores. Whatever may be these developments, a technically and economically optimum selection is possible between fossil fuel and nuclear fuel for the production of a supplementary amount of steam.

The only disadvantage is that, if progress of the nuclear cores does not proceed as fast as expected, the period during which the superheater will be overloaded might be too long, and some extra maintenance might be required, the cost of which is known to be a very minor factor.

For purposes of illustration, an economic comparison is set forth below. The calculations are made on the basis of a pressurized water nuclear power station. The secondary cycle feedwater temperature is assumed at 171° C. at inlet of the NSG, and the steam pressure at outlet of the NSG is 35 kg./sq. cm. The steam is superheated to 540° C. by a fossil fuel fired superheater. With these assumptions, the ratio of the heat necessary to produce superheated steam at 540° C. from feedwater at 171° C., to the heat necessary to superheat at 540° C. saturated steam at 35 kg./sq. cm., is equal to 3.75.

I will retain the symbols introduced hereinabove and I will consider the following three cases:

*1st case.*—Nuclear power station with normal superheater, the nominal output of the power station being based on an evaporation capacity corresponding to the first core heat output.

*2nd case.*—Nuclear power station with normal superheater, the nominal output of the power station being based on an evaporation capacity 1.3 times that corresponding to the first core heat output.

*3rd case.*—The nuclear power station according to the invention, the nominal power of the power station being the same as in case 2.

The following Table I shows the principal characteristics of the nuclear power station in each of the three abovementioned cases.

TABLE I

| | 1st Case | 2d Case | 3d Case |
|---|---|---|---|
| Evaporative capacity of the nuclear steam generator with the first core (Type A), lbs. per hour of steam. | $P_0$ | $P_1$ | $P_0$ |
| Normal capacity of the superheater lbs. per hour of steam. | $P_0$ | $P_1$-1,3 $P_0$ | |
| Normal capacity of the superheater-evaporator, lbs. per hour. | | | $P_1$-1,3 $P_0$ |
| Overload capacity of the superheater in percent of its thermal load with a steam flow $P_0$. | 100% | 130% | 156% |
| Additional evaporation and superheating capacity when nuclear steam generator steam flow is $P_0$. | 0 | 0 | 0.15 $P_0$ |
| Nominal gross output power of the station, kw | $N_0$ | 1.3 $N_0$ | 1.15 $N_0$ |
| Maximum gross output of the station with the first core (A) kw. | $N_0$ | $N_0$ | 1.3 $N_0$ |
| Maximum gross output of the station with an improved core (B) increasing by 10% the NSG capacity, kw. | $N_0$ | 1.10 $N_0$ | 1.22 $N_0$[1] |
| Same, with core (C) increasing by 20% the NSG capacity. | $N_0$ | 1.20 $N_0$ | 1.30 $N_0$[2] |
| Same, with core (D) increasing by 30% the NSG capacity. | $N_0$ | 1.30 $N_0$ | 1.30 $N_0$ |
| Capital cost of the NSG | $C_0$ | 1.02 $C_0$ | 1.02 $C_0$ |
| Capital cost of the power station without the NSG | 0.65 $C_0$[3] | 0.76 $C_0$[3] | 0.77 $C_0$[3] |
| Total capital cost of the power station | 1.65 $C_0$ | 1.78 $C_0$ | 1.79 $C_0$ |
| Investment per kw. effective gross capacity with type A core. | $1.65 \frac{C_0}{N_0}$ | $1.78 \frac{C_0}{N_0}$ | $1.56 \frac{C_0}{N_0}$ |
| Same with type B core | $1.65 \frac{C_0}{N_0}$ | $1.62 \frac{C_0}{N_0}$ | $1.45 \frac{C_0}{N_0}$ |
| Same with type C core | $1.65 \frac{C_0}{N_0}$ | $1.48 \frac{C_0}{N_0}$ | $1.375 \frac{C_0}{N_0}$ |
| Same with type D core | $1.65 \frac{C_0}{N_0}$ | $1.37 \frac{C_0}{N_0}$ | $1.375 \frac{C_0}{N_0}$ |

1 This corresponds to a superheating of 1.1 $P_0$ lbs. per hour of steam produced by the nuclear steam generator and to the additional production of $$\frac{156-120}{375} P_0 = 0.12 P_0 \text{ lbs. per hour}$$

of additional superheated steam by the superheater.

2 This corresponds to the superheating of 1.2 $P_0$ lbs. per hour of steam produced by the nuclear steam generator and to the additional production of $$\frac{156-120}{375} = 0.10 P_0 \text{ lbs. per hour}$$

of additional superheated steam by the superheater.

3 The capital cost of the power station without the NSG is supposed to vary with the power 0.6 of the gross nominal output, a supplement of 0.01 $C_0$ is provided in the capital cost of the third case, to take account of the special feature of the superheater.

If it is assumed that in all cases the net output of the power station is the same fraction of the gross output, and that the load factor is the same, Table II shows the capital cost per kwh. calculated in percent of their value in the first case.

TABLE II

| | Capital Cost Per Kwh. | | |
|---|---|---|---|
| | 1st Case | 2d Case | 3d Case |
| With type A core | 100 | 108 | 94.5 |
| With type B core | 100 | 98 | 88.5 |
| With type C core | 100 | 90 | 83.3 |
| With type D core | 100 | 83 | 83.3 |

Tables I and II show the economic advantages of the invention, as far as capital cost is concerned. For practical applications, a more detailed economic analysis is necessary in each particular case, and the fuel and operating costs should also be compared. However it appears that in all regions where the conventional fuel cost is low, the invention is likely to decrease the total cost of the delivered power.

As far as the construction of the water injecting means is concerned, the following steps should be taken by way of precaution, either singly or in combination.

Distribution of the injection between two or more pipes or headers.

Distribution of the injection in each of the pipes or headers.

Protection of the pipe or header by a screen or cover made of stainless steel for instance.

Setting under a high pressure of the water injected through a pump with a view to benefit from a high difference in pressure and to obtain a very fine atomization.

Draining of the pipes or headers.

The invention will be better understood from the following specification with reference to the accompanying drawing forming a part hereof.

Referring to the drawing:

FIG. 1 is a schematic diagram illustrating an arrangement including a nuclear steam generator and a superheater.

FIG. 2 is a diagrammatic side elevational view showing an apparatus for reducing the extent of superheating through water atomization for use with the arrangement according to FIG. 1.

In FIG. 1, 1 designates the nuclear steam generator and 2, the superheater which comprises three tubular sections 3, $3_1$, and $3_2$.

Each of the three tubular sections, except the first section, is provided at the end corresponding to the inlet of steam with water injection means $4_1$, $4_2$ for reducing the extent of superheating.

5 designates the line feeding steam from the nuclear generator 1 into the first superheater section $3_1$, while 6 designates the outlet line leading superheater steam from the third section $3_2$ to a turbine 7 which drives an alternator 8.

Water is fed into the nuclear steam generator 1 and into the water injection means $4_1$, $4_2$ through a pipe 9 in which are inserted a feed water pump 10, and a booster pump 11 for increasing the pressure of the water delivered to the injectors $4_1$, $4_2$, the pipe 9 being from a condenser 12 at the outlet end of the turbine 7.

In FIG. 2, the water injection atomizer comprises a steam inlet 13, a steam outlet 14, a water atomizing nozzle 15 and a drainage valve 16.

I claim:

1. In the method of operating a power generating system of the type comprising a steam generator including a nuclear reactor having a predetermined normal output; a superheater fired by fossil fuel and connected to receive steam from said generator, said superheater comprising a plurality of serially connected sections; and a load connected to receive and utilize superheated steam from said superheater at predetermined full load rate, said superheater, when operating under normal load conditions, adequately superheating the full normal output of said generator; the improvement which comprises the steps of: initially operating said generator to deliver a steam output less than said normal output and insufficient to supply said load at said full load rate, the full normal output of said generator being sufficient therefor; injecting water into said superheater at a junction between two of said sections; initially operating said superheater under overload conditions to vaporize said injected water in addition to superheating the steam received by said load; subsequently increasing the output of said generator; thereupon reducing said water injecting step; and thereupon operating said superheater under decreased load conditions, said step of increasing the output of said generator being performed by the substitution of cores in said nuclear reactor, the replacement cores having an increased output with respect to the cores used in initially operating said generator.

2. In the method of operating a power generating system of the type comprising a steam generator including a nuclear reactor having a predetermined normal output; a superheater fired by fossil fuel and connected to receive steam from said generator, said superheater comprising a plurality of serially connected sections; and a load connected to receive and utilize superheated steam from said superheater at predetermined full load rate, said superheater, when operating under normal load conditions, adequately superheating the full normal output of said generator; the improvement which comprises the steps of: initially operating said generator to deliver a steam output less than said normal output and insufficient to supply said load at said full load rate, the full normal output of said generator being sufficient therefor; injecting water into said superheater at a junction between two of said sections; initially operating said superheater under overload conditions to vaporize said injected water in addition to superheating the steam received by said load; subsequently increasing the output of said generator to said full normal output thereof; thereupon discontinuing said water injecting step; and thereupon operating said superheater under normal load conditions, said step of increasing the output of said generator being performed by the substitution of cores in said nuclear reactor, the replacement cores having an increased output with respect to the cores used in initially operating said generator.

References Cited by the Examiner

UNITED STATES PATENTS 2,755,782 7/1956 Campbell et al. ------ 122—459
2,872,908 2/1959 Jantscha et al. ------ 122—459

FOREIGN PATENTS 561,251 10/1957 Belgium.
679,083 9/1952 Great Britain.

OTHER REFERENCES

Power: May 1955, pp. 81 and 200.

REUBEN EPSTEIN, *Primary Examiner.*